H. URECK.
COMBINED GAFF HOOK AND FISH ROD.
APPLICATION FILED FEB. 19, 1916.

1,302,457. Patented Apr. 29, 1919.

INVENTOR
Harry Ureck
By Morsell, Keeney & French,
ATTORNEYS

UNITED STATES PATENT OFFICE.

HARRY URECK, OF BURLINGTON, WISCONSIN, ASSIGNOR OF ONE-HALF TO WILLIAM E. MOORE, OF BURLINGTON, WISCONSIN.

COMBINED GAFF-HOOK AND FISH-ROD.

1,302,457.   Specification of Letters Patent.   Patented Apr. 29, 1919.

Application filed February 19, 1916. Serial No. 79,332.

*To all whom it may concern:*

Be it known that I, HARRY URECK, a citizen of the United States, and resident of Burlington, in the county of Racine and State of Wisconsin, have invented new and useful Improvements in Combined Gaff-Hooks and Fish-Rods, of which the following is a description, reference being had to the accompanying drawings, which are a part of this specification.

This invention relates to improvements in combined gaff hook and fish rod.

In fishing for comparatively large fish it is the usual practice to land the fish into the boat by means of a landing net or gaff hook and with the larger fish the latter means is usually employed. This manner of landing the fish is very satisfactory with the exception that the landing device used is not always in a position to be conveniently grasped by the fisherman and consequently many large fish are lost during the interval of time between the arrival of the fish to gaffing position and getting possession of the gaff hook usually just out of reach in the boat. Losses of this nature are not conducive to the pleasure of the trip nor to the temper of the fisherman and consequently are very objectionable.

It is one of the objects of the present invention to overcome the before mentioned objectionable features and provide a landing device in the form of a gaff hook which is combined with and forms part of the fish rod.

A further object of the invention is to provide a combined gaff hook and fish rod in which a gaff hook telescopes into the handle and first joint of the rod in a manner to be easily and quickly withdrawn from the rod and used without the necessity of changing position or looking for the gaff hook.

A further object of the invention is to provide a combined gaff hook and fish rod in which the gaff hook may be used either as a hook or a spear.

A further object of the invention is to provide a combined gaff hook and fish rod in which improved means are provided for removing a fish from the hook.

A further object of the invention is to provide a combined gaff hook and fish rod in which the gaff is provided with a foldable hook portion which may be locked in folded position when desired.

A further object of the present invention is to provide a combined gaff hook and fish rod which is of very simple construction, is strong and durable and may be manufactured at a minimum cost.

With the above and other objects in view the invention consists of the improved combined fish rod and gaff hook and its parts and combinations as set forth in the claims, and all equivalents thereof.

In the accompanying drawing in which the same reference characters indicate the same parts in all of the views.

Figure 1:
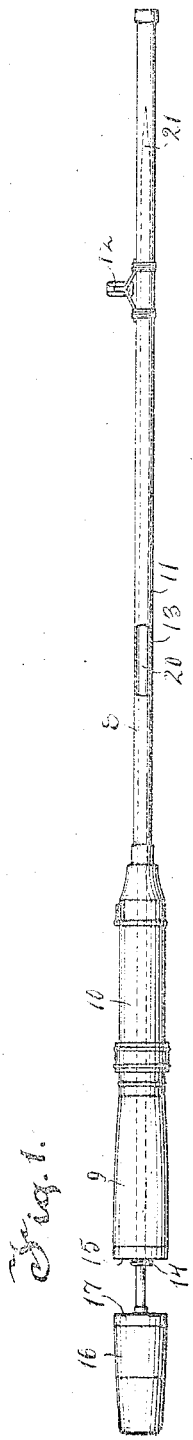
Figure 1 is a side view partly in section of the handle and lower joint of the improved combined gaff hook and fish rod, the gaff hook portion being shown as partly withdrawn from the fish rod.

Referring to the drawing the numeral 8 indicates the handle or butt joint of a fish rod and which comprises the handle portion 9, the reel seat 10, the rod portion 11 and a line guide 12. The rod portion 11 as shown is formed of tubular steel of ordinary construction but may be formed of any other material such as bamboo or wood and bored to provide a tubular portion or wood provided with a metallic tubular lining to form a bore. The bore 13 of the rod portion extends through the reel seat and handle portions 10 and 9 and also through a threaded projection 14 which extends from the lower flat end 15 of said handle. An extension handle 16 having a forward flat face 17 of a size corresponding to the flat end 15 of the handle 9 is provided with a threaded recess 18 to receive the threaded projection 14 of the handle 9. The thread of this projection is very coarse and short to form a strong connection between the parts and to provide for the parts being quickly separated by a slight turn of the extension handle.

When the two handles are connected together the extension handle forms a flush continuation of the rod handle.

The extension handle has a forwardly projecting rod 20 connected thereto which extends and fits within the tubular portion of the handle, reel seat and rod section. The rod 20 forms the shank of the gaff hook and its removable forward pointed end portion 21 is formed as a separate section which has a threaded connection 22 with the threaded end 23 proper of the rod.

Figure 2:
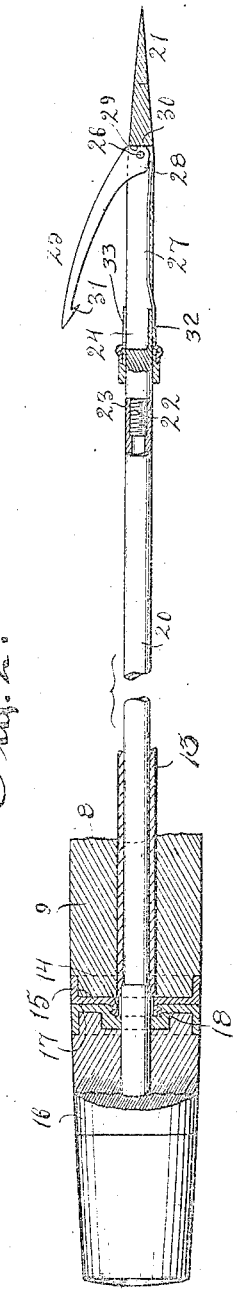
Fig. 2 is an enlarged side view of the gaff hook and a portion of the fish rod handle, parts of the handle and gaff being shown in section to illustrate interior construction and with the barbed hook in open position as if withdrawn from the fish rod and the hook shown in its released position.
Figure 3:
Fig. 3 is a top view of the point and hook portion of the gaff detached from the handle part.

The pointed section of the rod is formed with an elongated slot 24 to receive the foldable barbed hook 25 which is pivotally connected at its inner end to said pointed section by a pivot pin 26. A flat spring 27 mounted at one end in the section has its opposite free end bearing against a shouldered portion 28 of the hook 25 and is adapted to yieldingly hold the hook in open position as shown in Fig. 2 of the drawing.

The pivoted end portion of the hook is also provided with a stop shoulder 29 which engages a part 30 of the pointed section and serves to limit the outward swing of the hook 25.

A barb 31 is formed on the free end of the hook to more securely hold the fish thereon.

Figure 4:
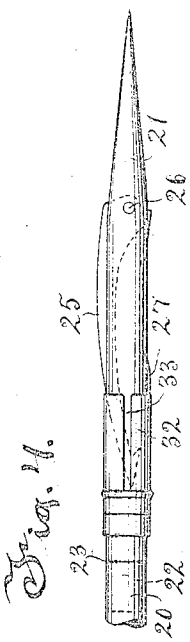
Fig. 4 is a side view showing means for locking the hook portion in closed position.

In the modified form shown in Fig. 4 a corrugated sleeve 32 is mounted on the pointed section for holding the hook in closed position. The sleeve is provided with a recessed portion 33 so that when the sleeve is turned to bring the recess into register with the elongated slot 24 of the section the hook 25 will automatically swing outwardly.

In using the first described form of hook the hook may be used in the ordinary manner or the pointed end may be driven directly into the fish and any down pull of the fish will cause the hook portion to swing outwardly and firmly hold the fish and when it is desired to remove the fish from the hook it is only necessary to push the pointed section through the fish and unscrew said section from the main portion and withdraw the main portion from the fish.

In using the modified form the hook will remain in closed position while being pushed into the fish until the sleeve is buried and then by giving a slight turn to the rod, the sleeve being held from turning by engagement with the fish, until the hook is in register with the sleeve recess, the hook will then be released and spring outwardly as before described.

From the foregoing description it will be seen that the combined gaff hook and fish rod is of very simple construction and is always in a convenient position for use.

What I claim as my invention is:

1. The combination with the butt joint of a fish rod of tubular construction substantially throughout the length of the joint, said joint having a handle section, of a gaff hook, the shank portion of which is adapted to be slidably received in the tubular joint of the rod, said shank having an elongated groove near its inner end, a pointed extremity at said end, a hook pivotally mounted within one end of the groove, a shouldered portion formed on said hook for engagement with the end wall of the groove to limit the outward movement of the hook to an acute angular position with respect to the shank and a spring positioned to force the hook into such angular position.

2. The combination with the butt joint of a fish rod of tubular construction substantially throughout the length of the joint, said joint having a handle section, of a gaff shank slidably extending within the butt joint and having a foldable hook mounted within its inner end portion and a handle section at its outer end, which forms a continuation of the handle of the butt joint and means whereby the two handle sections may be removably secured together by rotation with respect to one another.

3. The combination with the butt-joint of a fish rod of tubular construction substantially throughout the length of the joint, said joint having a handle section, of a gaff shank slidably extending within the butt joint and having a foldable hook mounted within its inner end portion and a handle section at its outer end, which forms a continuation of the handle of the butt joint and a threaded extension formed on the first mentioned handle section for engagement with a socket in the second mentioned handle section for removably securing the two sections together to hold the gaff hook in position.

4. A gaff hook comprising a shank, a handle secured to one end thereof, a pointed extremity located at the opposite end, a longitudinally disposed groove formed in said shank adjacent the pointed extremity, a spring actuated barb pivotally mounted and adapted to be housed within the groove, means for holding the barb within said groove and means whereby when the gaff hook is in use a partial rotation thereof will release the barb.

5. A gaff hook comprising a shank, a handle secured to one end thereof, a pointed extremity located at the opposite end, a longitudinally disposed groove formed in said shank adjacent the pointed extremity, a spring actuated barb pivotally mounted and adapted to be housed within the groove and a sleeve carried by said shank for normally holding the barb within the groove.

6. A gaff hook comprising a shank, a handle secured to one end thereof, a pointed extremity located at the opposite end, a longitudinally disposed groove formed in said shank adjacent the pointed extremity, a spring actuated barb pivotally mounted and adapted to be housed within the groove and a corrugated slotted sleeve mounted to revolve upon said shank and adapted to normally hold a barb within the groove and to permit of the release of the hook when the latter is in use for a partial rotation of the shank.

In testimony whereof, I affix my signature.

HARRY URECK.